United States Patent [19]
Kim

[11] Patent Number: 5,662,402
[45] Date of Patent: Sep. 2, 1997

[54] PROJECTOR WITH DETACHABLE LIQUID CRYSTAL PANEL

[75] Inventor: Hoo-Shik Kim, Suwon, Rep. of Korea

[73] Assignee: Samsung Aerospace Industries, Ltd., Kyeongsangnam-do, Rep. of Korea

[21] Appl. No.: 616,231

[22] Filed: Apr. 11, 1996

[30] Foreign Application Priority Data

Apr. 14, 1995 [KR] Rep. of Korea ............... 95-8813

[51] Int. Cl.$^6$ ................................................... G03B 21/28
[52] U.S. Cl. .......................... 353/119; 353/38; 348/744
[58] Field of Search ............... 353/37, 38, 119, 353/122, 98, 99, 71; 348/744, 790, 795

[56] References Cited

U.S. PATENT DOCUMENTS

| | | | |
|---|---|---|---|
| 5,187,510 | 2/1993 | Vogeley et al. | 353/122 |
| 5,376,979 | 12/1994 | Zavracky et al. | 353/122 |
| 5,396,304 | 3/1995 | Salerno et al. | 353/122 |
| 5,400,095 | 3/1995 | Minich et al. | 353/122 |
| 5,408,284 | 4/1995 | Berger et al. | 353/122 |
| 5,537,171 | 7/1996 | Ogino et al. | 353/38 |

*Primary Examiner*—William Dowling
*Attorney, Agent, or Firm*—Finnegan, Henderson, Farabow, Garrett & Dunner, L.L.P.

[57] ABSTRACT

A projector with a detachable liquid crystal panel. A lamp emits a certain amount of focused source light rays. A reflector reflects the focused source rays of the lamp into uniform spread light rays. A planar reflector reflects the spread light rays of the reflector into planar light rays. A Fresnel lens focuses the planar light rays of the planar reflector. A detachable LCD panel section rotatingly transmits the incident focused light rays from the Fresnel lens in accordance with a picture data to be displayed. An image-forming optical system for forming images from the incident light rays incoming from the LCD panel section. A small LCD panel is detachably formed in an LCD projector. Thus, if the surrounding illumination is bright, pictures can be viewed by attaching the LCD panel to an LCD TV. If the pictures are to be watched through a large screen, the LCD panel is attached to the LCD projector so as to magnify the pictures.

11 Claims, 5 Drawing Sheets

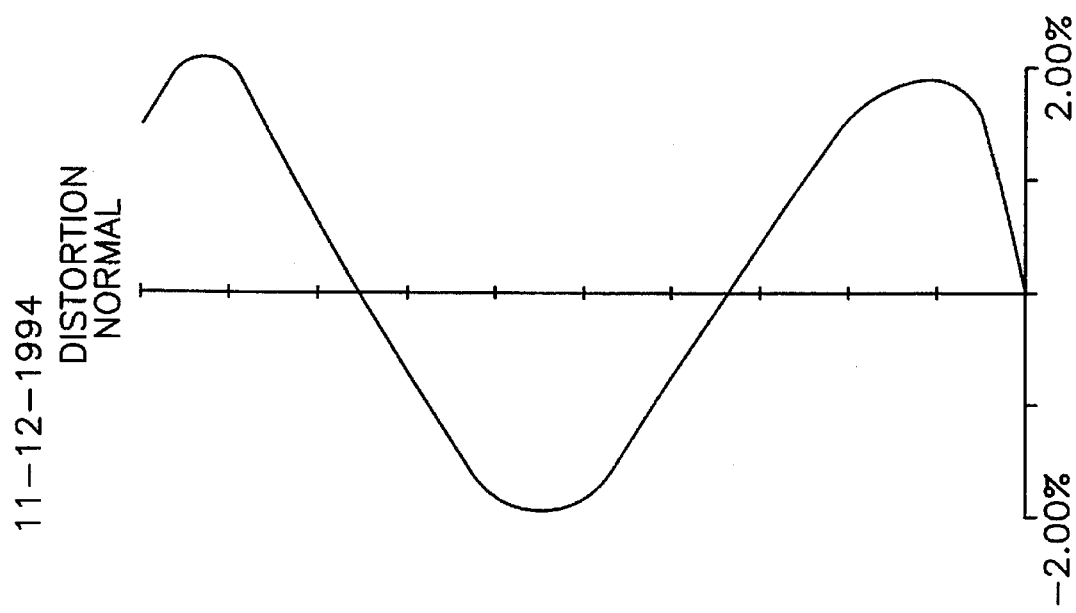
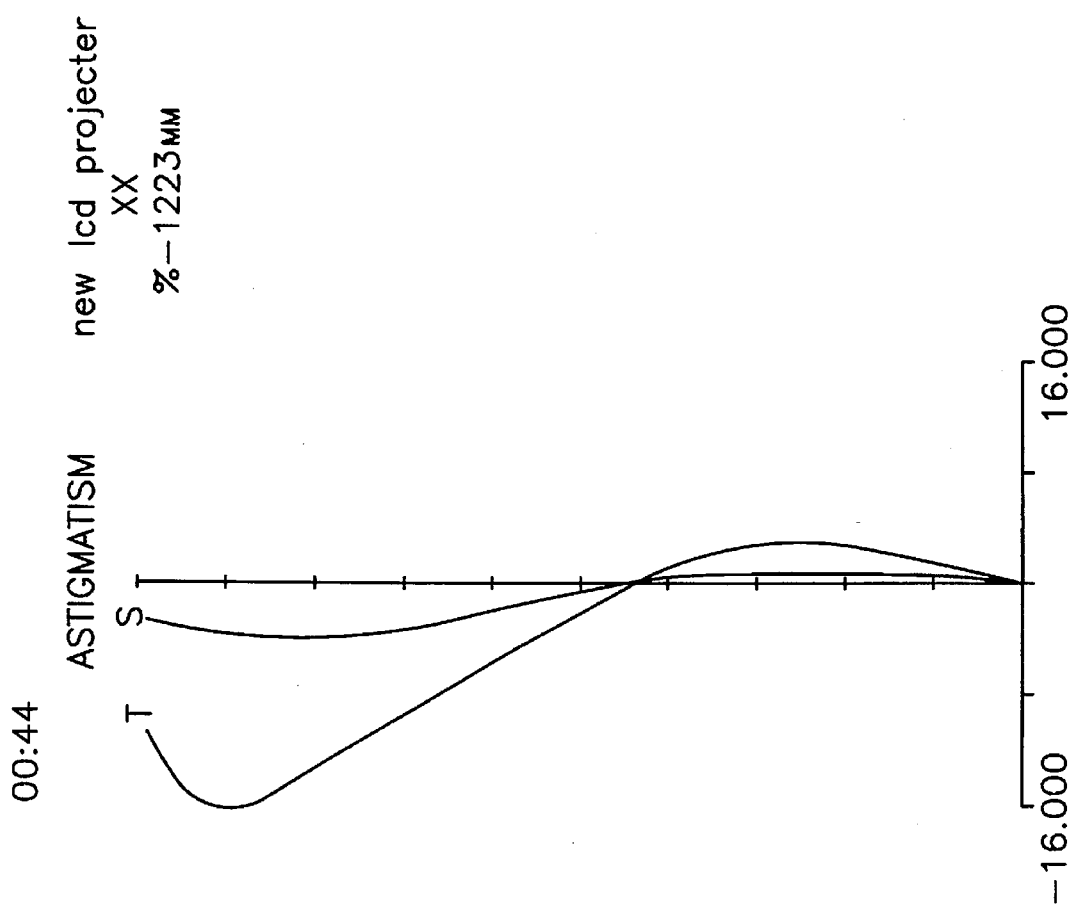

PROJECTOR WITH DETACHABLE LIQUID CRYSTAL PANEL

BACKGROUND OF THE INVENTION (1) Field of the Invention

The present invention relates to a projector with a detachable liquid crystal panel attached thereon. More specifically, the present invention relates to a portable projector with a small detachable liquid crystal panel for displaying pictures in accordance with externally supplied video signals, and the pictures displayed on the small liquid crystal panel are magnified to form images, thereby forming an optical system.

(2) Description of the Related Art

In accordance with the progress of process technology for thin film transistors (TFT), liquid crystal panels have become finer and larger. Now, liquid crystal TVs ("LCD TVs") are available for practical use.

However, it is technically more difficult to manufacture large LCD panels than to manufacture small, fine LCD panels due to process problems. Further, the price becomes higher.

Therefore, in manufacturing an LCD TV of over 40 inches, it is advantageous to optically expand a small panel through projection. Practically, direct viewing LCD panels are used for computer monitors and portable TVs.

FIG. 1 illustrates a construction of a conventional single plate type LCD projector.

As shown in FIG. 1, the conventional single plate type LCD projector includes: an arc lamp 1, a reflector 2, an infrared ray filters 3, a first polarizing plate 4, an LCD panel 5, a second polarizing plate 6, and an image forming lens system 7.

If signals to be displayed on the LCD panel 5 are transmitted from a signal processing section (not shown) then an illuminating light almost like natural color, emitted from the arc lamp 1, is reflected back by the reflector 2 and irradiated on the LCD panel 5.

The illuminating light which is irradiated from the reflector 2 undergoes a filtering at the infrared ray filter 3 to eliminate infrared rays and ultraviolet rays which deteriorate the LCD panel. Then, the filtered light rays pass through the first polarizing plate 4 which passes only linearly polarized rays. The light rays which are thus passed are then irradiated on the LCD panel 5.

When the illuminating light rays are irradiated onto the LCD panel 5, the incident linearly polarized rays are rotatingly outputted in accordance with the pixel driving signals of the signal processing section.

The light rays which have passed through the LCD panel 5 have transmittance differences in accordance with the phase difference relative to the polarized light rays which are rotated at the LCD panel by the second polarizing plate 6. Therefore, contrasts are generated between the respective pixels. Then, the rays are magnified by the image-forming optical system 7 to form an image on a screen 8.

However, in the above described conventional LCD projector, the pictures which are projected on the screen become ambiguous in a bright environment. In other words, the picture which is projected on the screen is composed of pixels of red (R), green (G), and blue (B), and, in accordance with the brightness of the respective pixels, the gradation, i.e., contrasts are decided.

For example, if the surrounding illumination is dark, that is, if the surrounding brightness is 0; if it is assumed that the brightness of the pixels are S1=10, S2=20, S3=30, S4=40, S5=50; and if the ambient brightness is 100: the brightness of the respective pixels become S1'=110, S2'=120, S3'=130, S41=140, and S5'=150.

On the other hand, if the ambient brightness is dark, the pixels S1–S5 gain a contrast of S5:S1=5:1 at maximum. However, if the ambient brightness is bright, the contrast becomes as low as S5':S1'=1.36:1.

Accordingly, if the ambient brightness is too bright, the contrast of the picture becomes aggravated, and therefore the projected pictures are difficult to discern. Further, if the projected pictures are to be discerned, a brighter illuminating source has to be used. Consequently, the power consumption increases, and the apparatus can be damaged due to the increased heat release.

SUMMARY OF THE INVENTION

The present invention is intended to overcome the above described disadvantages of the conventional technique.

The present invention provides a portable projector with a detachable LCD panel attached, in which an LCD panel for displaying pictures in accordance with externally inputted video signals is provided in a detachable small form, and an optical system for magnifying the displayed picture of the small LCD panel to form images.

In achieving the above object, the projector with a detachable LCD panel attached according to the present invention includes a plurality of elements. A lamp emits a certain amount of focused source light rays. A reflector reflects the focused source rays of the lamp into uniform spread light rays. A planar reflector reflects the spread light rays of the reflector into planar light rays. A Fresnel lens focuses the planar light rays of the planar reflector. A detachable LCD panel section rotatingly transmits the incident focused light rays from the Fresnel lens in accordance with a picture data to be displayed. An image-forming optical system forms images from the incident light rays incoming from the LCD panel section.

In another aspect of the present invention:

A lamp emits a certain amount of focused source light rays. A reflector reflects the focused source rays of the lamp into uniform spread light rays. A planar reflector reflects the spread light rays of the reflector into planar light rays. A Fresnel lens for focuses the planar light rays from the planar reflector. A detachable LCD panel section rotatingly transmits the incident focused light rays from the Fresnel lens in accordance with a picture data to be displayed. An image-forming optical system forms images from the incident light rays incoming from the LCD panel section. First and second mirrors installed between the LCD panel section and the image-forming optical system shorten the total distance of the optical system.

BRIEF DESCRIPTION OF THE DRAWINGS

The above object and other advantages of the present invention will become more apparent by describing in detail the preferred embodiment of the present invention with reference to the attached drawings in which:

FIG. 4 illustrates the astigmatism for the image-forming optical system shown in FIG. 3;

FIG. 5 illustrates the distortion aberration for the image-forming optical system shown in FIG. 3;

DESCRIPTION OF THE PREFERRED EMBODIMENT

Figure 1:
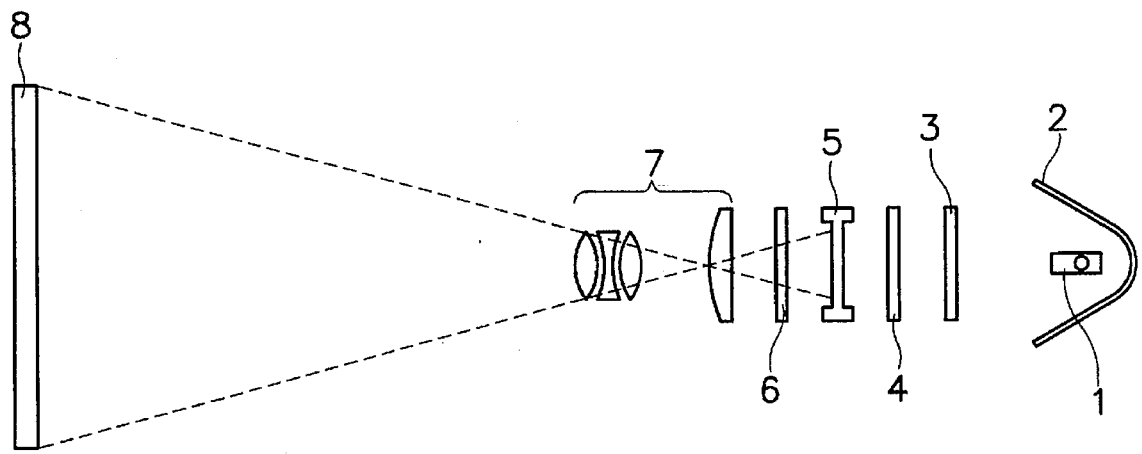
FIG. 1 illustrates the constitution of a conventional single plate type LCD projector.
Figure 2:
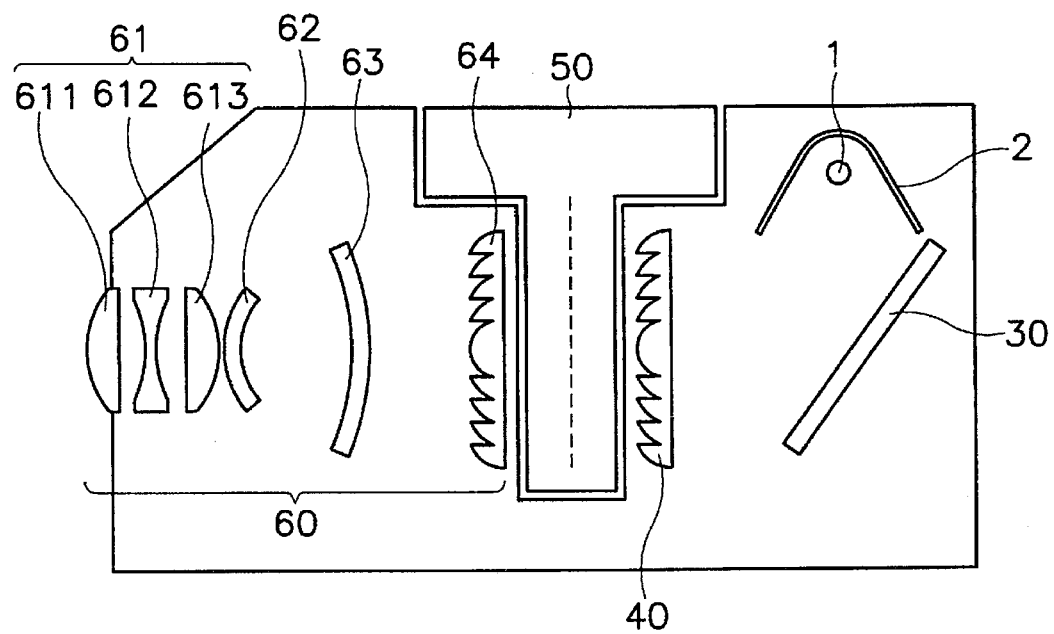
FIG. 2 illustrates the constitution of a first embodiment of a projector with a detachable LCD panel according to the present invention.

A first embodiment of a projector with a detachable LCD panel is shown in FIG. 2. An arc lamp 1 emits radiation or light rays. A reflector 2 reflects the emitted light rays from the arc lamp 1. A planar reflector 30 reflects the reflected light rays of the reflector 2 into planar light rays. A Fresnel lens 40 focuses the planar light rays from the planar reflector 30. A detachable LCD panel section 50 rotatingly transmits the incident focused light rays from the Fresnel lens 40 in accordance with picture data to be displayed. An image-forming optical system 60 forms images from the incident light rays from the LCD panel section 50.

Figure 3:
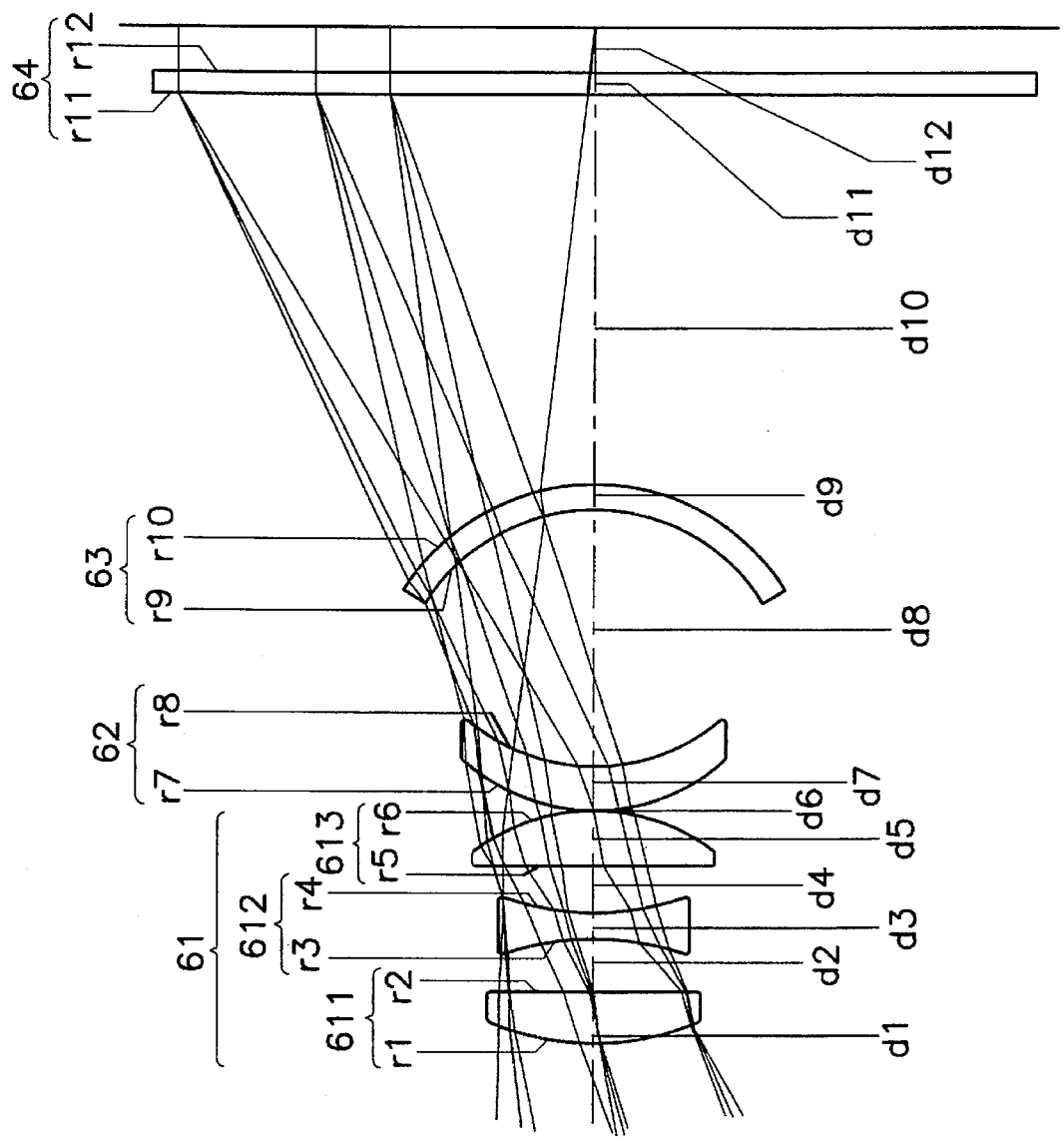
FIG. 3 illustrates the constitution of an image-forming optical system of a first embodiment of the projector with a detachable LCD panel according to the present invention.

As shown in FIGS. 2 and 3, the image-forming optical system 60 of the compact LCD projector includes a plurality of lenses. A first lens group 61 consists of a first lens 611 having a convex face toward the image and having a positive refracting power; a second lens 612 having both faces concave (bi-concave) and having a negative refracting power; and a third lens 613 having a convex face toward the LCD panel section 50 and having a positive refracting power. A second lens group 62 consists of meniscus type lenses having convex faces toward the image. A third lens group 63 consists of a meniscus type non-spherical lens having convex faces toward the LCD panel section 50. A fourth lens group 64 consists of Fresnel lenses.

The first lens group 61 of the image-forming system 60 is a triplet type lens group consisting of three lenses of positive-negative-positive form. The first lens group 61 is the main image forming lens group for forming images from incident rays from the LCD panel section 50.

The detachable LCD panel section 50 according to the first embodiment of the present invention includes: a first polarizing plate for allowing a pass-through of only linearly polarized light rays from among the focused incident light rays from the Fresnel lens 40; a signal processing section for outputting signals to activate pixels in accordance with the video signals externally inputted; an LCD panel operated in accordance with the signals of the signal processing section, for rotatingly outputting the output signals of the first polarizing plate; and a second polarizing plate for varying its own transmittance in accordance with the phase difference relative to the rotatingly polarized light rays of the LCD panel, to generate contrasts between the respective pixels in its output.

The projector of the present invention operates in the following manner.

Generally, an LCD TV is compact and of light weight for lower power consumption and greater portability. However, the known LCD projectors, have a low irradiating efficiency. Therefore, if a bright picture is desired, strong illumination is required, increasing power consumption. Further, various devices for dissipating the generated heat are required, and therefore, the structure becomes complicated and inconvenient to carry.

Therefore, in the present invention, if the LCD TV is to be used, a back light and an LCD panel are attached in a set, to insure portability. If a large picture is to be obtained by projecting the picture on a screen, the LCD panel is detached, and is attached to the LCD projector. Then, using the light source of the lamp, the images are projected on the screen.

However, in this case, the size of the projector becomes large compared with the size of the LCD panel, with the result that the portability is decreased. Therefore, an image-forming optical system is provided for a magnified irradiation of the incident rays from the LCD panel, so that the projector may become compact.

In the case where pictures are to be projected on a screen through the LCD projector of the present invention, the light rays emitted from the arc lamp 1 are reflected by the reflector 2 and converted into uniformly spread light rays before being irradiated to the planar reflector 30. The planar reflector 30 converts the incident rays from the reflector 2 into planar light rays, so as to irradiate the rays to the Fresnel lens 40. The Fresnel lens 40 focuses the incident rays incoming from the planar reflector 30 to irradiate them to the LCD panel section 50.

If the light rays are to be converted into parallel rays by only the planar reflector 30 without using the Fresnel lens 40, then the effective diameter of the reflector 30 should be larger than the effective diameter of the LCD panel section 50.

For example, in the case of a 5-inch LCD panel which is widely used, if the light rays are to be incident on the LCD panel, a reflector of over 5 inches is required.

Therefore, to make the product more compact, a Fresnel lens having a positive refractive power is used in making the light rays irradiated to the LCD panel section 50.

Among the light rays which are irradiated to the LCD panel section 50, only the linearly polarized light rays pass through the first polarizing plate. Then, the light rays pass through the LCD panel in accordance with the operation of the pixels of the LCD panel which are driven in accordance with signals from the signal processing section. Then the light rays are made to have certain contrasts by passing through the second polarizing panel so as to be inputted into the image forming system.

The image forming system 60 magnifies the incident light rays to irradiate them to a screen.

The LCD panel section 50 according to the present invention includes a small panel of about 10.4 inches. In the case where the size of the image which is formed by the image-forming system by the help of the LCD panel section 50 is about 159 mm, a projected image of 1150 mm is formed at a distance of 2020 mm.

The principle of the image-forming is as follows.

The light rays which are outputted almost perpendicularly relative to the LCD panel section 50 pass through the Fresnel lens 64 and the non-spherical lens 63 of the image-forming system to be irradiated to the first lens group 61.

In order to shorten the total length of the optical system, the Fresnel lens 64 of the present invention has a short focal length of less than three times the focal length of the total optical system. Specifically, the focal length of the total optical system according to the present invention is 254.956 mm, while the focal length of the Fresnel lens 64 is 676.59 mm.

The reason for installing the Fresnel lens 64 follows. The diameter of the lens must be large, and the refractive index of the lens must be high. Therefore, if a general glass lens is used, the thickness and size of the lens becomes large. The overall size of the optical system thus becomes large, and the manufacturing cost is increased. Therefore, the Fresnel lens 64 is installed for forming a compact projector according to the present invention.

In the above, the third lens group 63, which consists of nonspherical lenses, optimizes the performance of the image-forming function of the light rays which are incoming through the Fresnel lens 64. Thus the light rays pass through the third lens group 63 to be inputted into the second lens group 62 to correct aberrations. Then the light rays are inputted into the first lens group 61 to form an image on the screen.

The second lens group 62 according to the present invention has a negative astigmatism, and therefore, it corrects the imbalance of a part of the astigmatism of the total optical system. At the same time, the second lens group 62 has a positive distortion aberration, so that a part of the distortion aberration caused by the third lens group 63 can be corrected.

The values of an actual example of an image-forming optical system of the detachable type LCD projector according to the present invention are shown in Table 1 below.

TABLE 1

| Reference No. i | Radius of curvature $r_i$ | Thickness $d_i$ | Refractive index (nd) | ABBE No. (v) |
| --- | --- | --- | --- | --- |
| 1 | 129.6071 | 16.0 | 1.696802 | 55.4 |
| 2 | −1345.7888 | 0.12 | | |
| | Stop | 17.95 | | |
| 3 | −125.8204 | 8.0 | 1.672701 | 32.2 |
| 4 | 169.6892 | 12.96 | | |
| 5 | −3091.1859 | 18.0 | 1.7130 | 53.9 |
| 6 | −101.5120 | 0.1 | | |
| 7 | 97.2170 | 14.0 | 1.7130 | 53.9 |
| 8 | 90.6759 | 82.5 | | |
| 9 | −96.2033 | 8.0 | 1.491 | 61.3 |
| 10 | −105.8315 | 123.67 | | |
| 11 | 332.2063 | 7.0 | 1.491 | 61.3 |
| 12 | ∞ | 12.0 | | |

In the above table, the 9th and 11th lenses have non-spherical faces, and non-spherical faces are defined by the following formula, while the non-spherical coefficients are as shown in Table 2 below.

$$X = \frac{(1/r)\rho^2}{1 + \sqrt{[1-(K+1)(1/R)^2\rho^2]}} + a_4\rho^4 + a_6\rho^6 + a_8\rho^8 + a_{10}\rho^{10}$$

TABLE 2

| | Non-spherical coefficient-9th lens | Non-spherical coefficient-11th lens |
| --- | --- | --- |
| K | −0.5301059961 | −0.11773469E +5 |
| $a_4$ | −0.2595813E −6 | 0.5022582E −6 |
| $a_6$ | 0.6796243E −10 | −0.3281661E −10 |

TABLE 2-continued

| | Non-spherical coefficient-9th lens | Non-spherical coefficient-11th lens |
| --- | --- | --- |
| $a_8$ | −0.1416262E −13 | 0.855752E −15 |
| $a_{10}$ | 0.9349121E −18 | −0.7441632E −20 |

Figure 6:
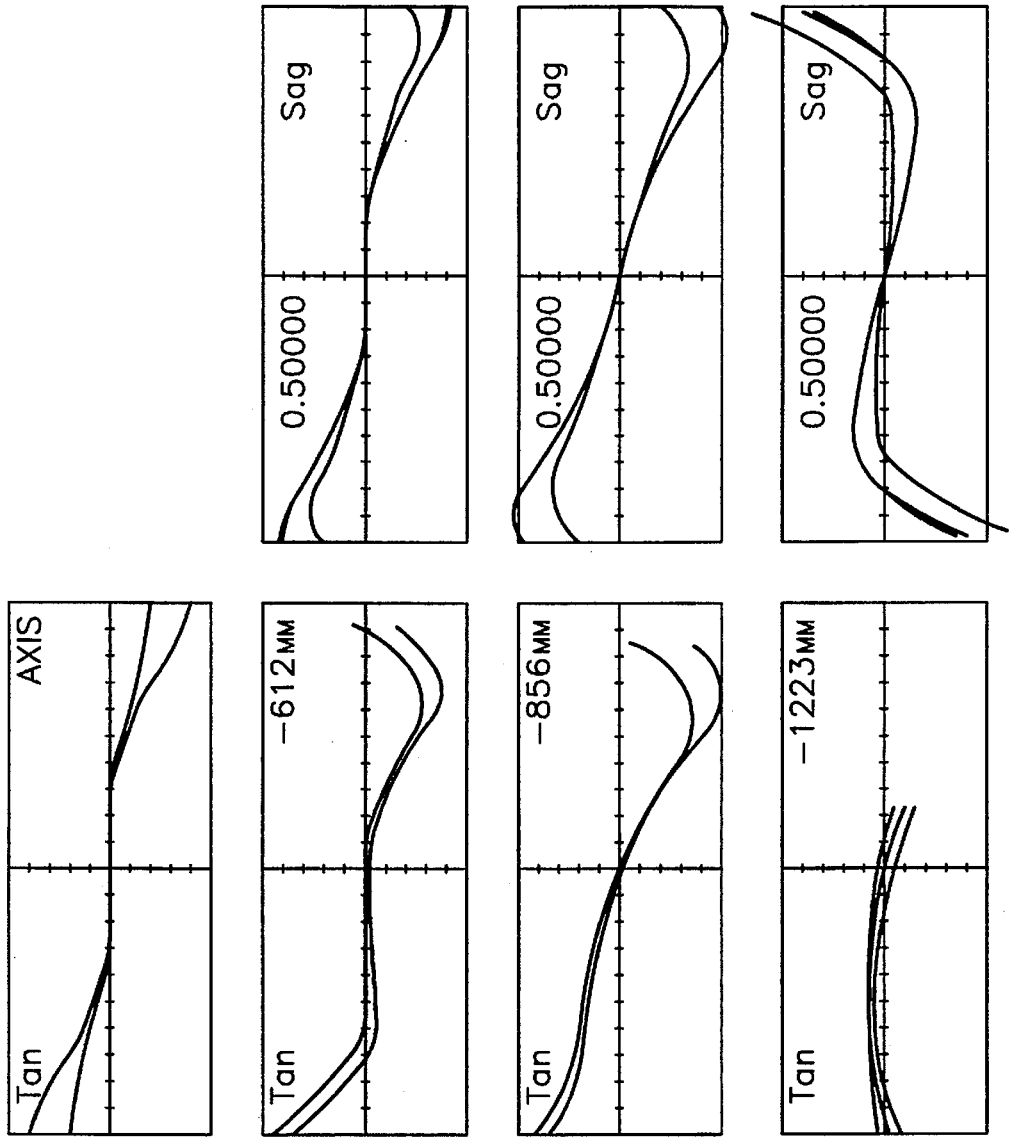
FIG. 6 illustrates the comma aberration of the image-forming optical system shown in FIG. 3.

FIGS. 4, 5, and 6 show some optical characteristics of the image-forming optical system shown in FIG. 3.

Now, a second embodiment of the projector with a detachable LCD panel according to the present invention will be described.

Figure 7:
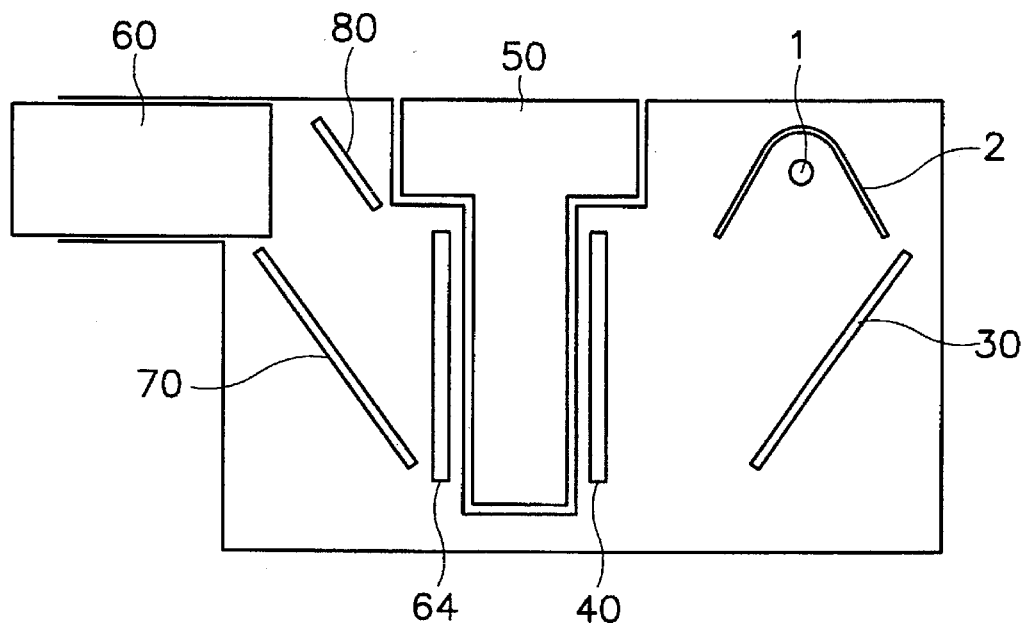
FIG. 7 illustrates the constitution of a second embodiment of a projector with a detachable LCD panel according to the present invention.

FIG. 7 illustrates the constitution of the second embodiment of the projector with a detachable LCD panel according to the present invention.

An arc lamp 1 emits light rays. A reflector 2 reflects the emitted light rays of the arc lamp 1. A planar reflector 30 reflects the reflected light rays of the reflector 2 into planar light rays. A Fresnel lens 40 focuses the incident planar light rays from the planar reflector 30. A detachable LCD panel section 50 rotatingly transmits the focused light rays from the Fresnel lens 40 in accordance with picture data to be displayed. An image-forming optical system 60 forms images from the incident light rays from the LCD panel section 50. First and second mirrors 70 and 80 are installed between the image-forming system 60 and the LCD panel 50.

The constitution of the image-forming system 60 of the second embodiment is the same as that of the first embodiment.

In this second embodiment, an LCD panel larger than that of the first embodiment may be used. To prevent an increase in the length of the optical system, the first mirror 70 and the second mirror 80 are installed between the third lens group 63 and the fourth lens group 64 of the image-forming system 60.

The light rays which are vertically irradiated from the LCD panel section 50 to the Fresnel lens 64 are reflected by the first mirror 70 and then by the second mirror 80. The light rays are irradiated to the third lens group 63 of the image-forming system 60, and the light rays pass through the first lens group to form a picture on the screen.

Now, an LCD TV with a detachable LCD panel according a third embodiment of the present invention will be described.

Figure 8:
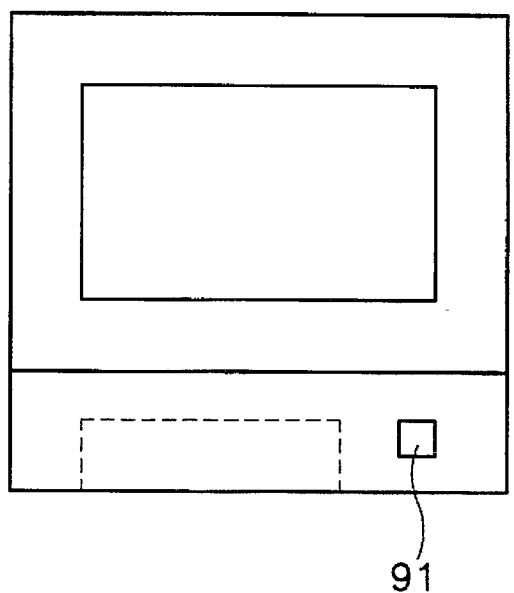
FIG. 8 is a frontal view of an LCD TV with a detachable LCD panel according to a third embodiment of the present invention.

FIG. 8 is a front view of an LCD TV with a detachable LCD panel according to a third embodiment of the present invention.

Figure 9:
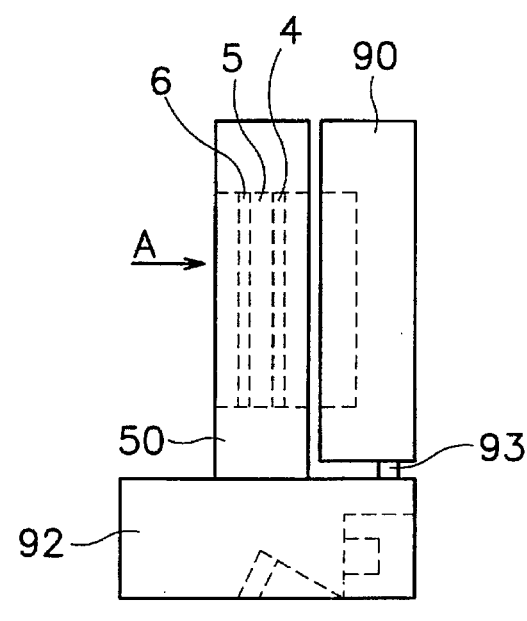
FIG. 9 is a partial sectional view of an LCD TV with a detachable LCD panel according to the third embodiment of the present invention.

FIG. 9 is a partial sectional view of the LCD TV with a detachable LCD panel according to the third embodiment of the present invention.

As shown in FIGS. 8 and 9, the LCD TV with a detachable LCD panel according to the third embodiment of the present invention includes: a back light 90; a power supply section 93 for supplying power to drive the back light; a remote controlled light receiving section 91; a signal processing section 92 for processing received video signals; and an LCD panel section 50 for displaying pictures in accordance with the processed picture data of the signal processing section 92.

The remote controlled light receiving section 91 of the LCD TV according to the third embodiment is provided in the number of two, and two of them are installed on the front face and on the bottom of the LCD TV respectively.

The LCD TV according to the third embodiment of the present invention is same the general LCD TV in its constitution and operation, except that the LCD panel section 50 is detachably attached.

In other words, if the ambient illumination is too bright, then the LCD panel section 50 is detached, and the LCD panel section 50 is attached the LCD TV. Then by utilizing the illumination of the back light 90, the desired pictures are viewed through the LCD TV.

Meanwhile, if the desired picture is to be watched through a large screen, then the LCD panel section 50 is detached, and the LCD panel section 50 is attached to the projector of the first embodiment, so that pictures can be enlarged to the screen.

According to the present invention as described above, a small LCD panel is detachably placed in an LCD projector, and thus, if the surrounding illumination is bright, the pictures can be viewed by attaching the LCD panel to an LCD TV, while if the pictures are to be watched through a large screen, the LCD panel is attached to the LCD projector so as to magnify the pictures.

Further, by using Fresnel lenses in the image-forming optical system of the projector with a detachable LCD panel attached according to the present invention, the LCD projector can be formed in a compact form.

Further, non-spherical lenses are installed between the Fresnel lenses and the main image-forming lens of the optical system, with the result that the image-forming performance of the lenses is improved.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A projector comprising:

a lamp for emitting source light rays;

a reflector for reflecting the source light rays as uniform light rays;

a planar reflector for reflecting the uniform light rays as parallel light rays;

a first Fresnel lens for focusing the parallel light rays;

a detachable LCD panel for transmitting the focused light rays from the Fresnel lens in accordance with video signals inputted thereto; and an image-forming optical system for forming display images from light rays transmitted by the LCD panel.

2. The projector as claimed in claim 1, wherein said image-forming optical system comprises:

a second Fresnel lens for focusing the light rays transmitted by said LCD panel;

a correcting lens group for correcting aberrations in focused light rays incoming from said second Fresnel lens; and a main image-forming lens group for forming the display images from the light rays incoming from the correcting lens group.

3. The projector as claimed in claim 2, wherein the main image-forming lens group comprises:

a first lens having a convex face toward the image side and a positive refractive power;

a second lens being biconcave and having a negative refractive power; and a third lens having a convex face toward the LCD panel and a positive refractive power.

4. The projector as claimed in claim 2, wherein the correcting lens group comprises:

a first lens group consisting of meniscus type lenses having convex faces toward the image side; and a second lens group consisting of meniscus type non-spherical lenses having convex faces toward the LCD panel.

5. The projector as claimed in claim 2, wherein the second Fresnel lens has a focal length less than three times a focal length of the total image-forming optical system.

6. The projector as claimed in claim 1, wherein the LCD panel section comprises:

a first polarizing plate for passing only linearly polarized light rays from among light rays from the first Fresnel lens;

a signal processing section for outputting signals to activate pixels corresponding to the images to be displayed in accordance with the inputted video signals;

a liquid crystal panel operated in accordance with the signals of the signal processing section, for outputting the output signals of the first polarizing plate; and a second polarizing plate for varying its own transmittance in accordance with a phase difference relative to the rotatingly polarized light rays from the liquid crystal panel, to generate contrasts between respective pixels in its output.

7. A projector, comprising:

a lamp for emitting source light rays;

a reflector for reflecting the source light rays as uniform light rays;

a planar reflector for reflecting the uniform light rays as parallel light rays;

a first Fresnel lens for focusing the parallel light rays;

a detachable LCD parcel for transmitting the focused light rays from the Fresnel lens in accordance with video signals inputted thereto;

an image-forming optical system for forming display images from light rays transmitted by the LCD panel; and first and second mirrors between the LCD panel and the image-forming optical system, for shortening a length of the projector.

8. The projector as claimed in claim 7, wherein said image-forming optical system comprises:

a second Fresnel lens for focusing the light rays transmitted by said LCD panel;

a correcting lens group for correcting aberrations of focused light rays incoming from said second Fresnel lens; and a main image-forming lens group for forming the display images from the light rays incoming from the correcting lens group.

9. The projector as claimed in claim 8, wherein the first and second mirrors are between the correcting lens group and said second Fresnel lens, for reflecting the incident light rays toward said correcting lens group.

10. A video display system, comprising:

An LCD TV having a back light and a power supply section for supplying power to drive said back light;

a projector having a projection light, a power supply section for supplying power to drive said projection light, and image projection optics;

and an LCD panel configured for installation in said LCD TV to display video images, lighted by said back light, in accordance with video signals inputted thereto and for installation in said projector, between said projection light and said projection optics, to form video images in accordance with video signals inputted thereto such that, video images generated by the LCD panel may be magnified by the projection optics.

11. The video system according to claim 10, further comprising:

a projection screen;

wherein said LCD panel is installed in said projector to display the magnified video images on said projection screen if ambient lighting is low, and wherein said LCD panel is installed in the LCD TV if ambient lighting is bright.

\* \* \* \* \*

UNITED STATES PATENT AND TRADEMARK OFFICE
CERTIFICATE OF CORRECTION

PATENT NO. : 5,662,402
DATED : September 02, 1997
INVENTOR(S) : Hoo-Shik KIM

It is certified that error appears in the above-indentified patent and that said Letters Patent is hereby corrected as shown below:

Claim 1, column 7, line 38, after "projector", insert --,--.

Claim 7, column 8, line 40, "parcel" should read --panel--.

Signed and Sealed this

Twentieth Day of January, 1998

BRUCE LEHMAN

Attest:

Attesting Officer    Commissioner of Patents and Trademarks